Dec. 11, 1923.         1,477,115
C. GAST
DOUBLE BARRELED MACHINE GUN WITH RECOILING BARRELS
Filed Sept. 30, 1920        5 Sheets-Sheet 2
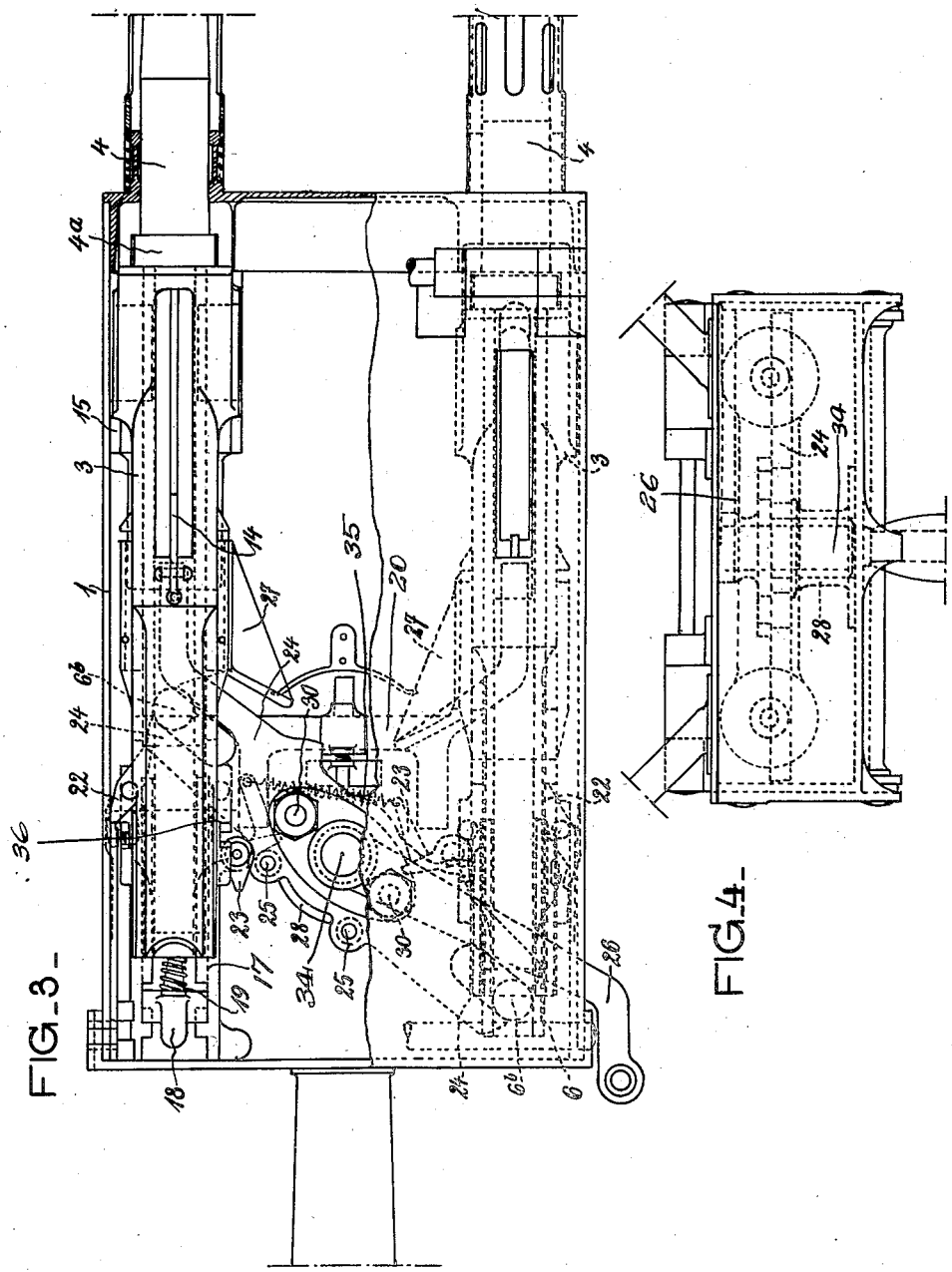
Inventor:
CARL GAST,
per H. W. Plumber
Attorney.

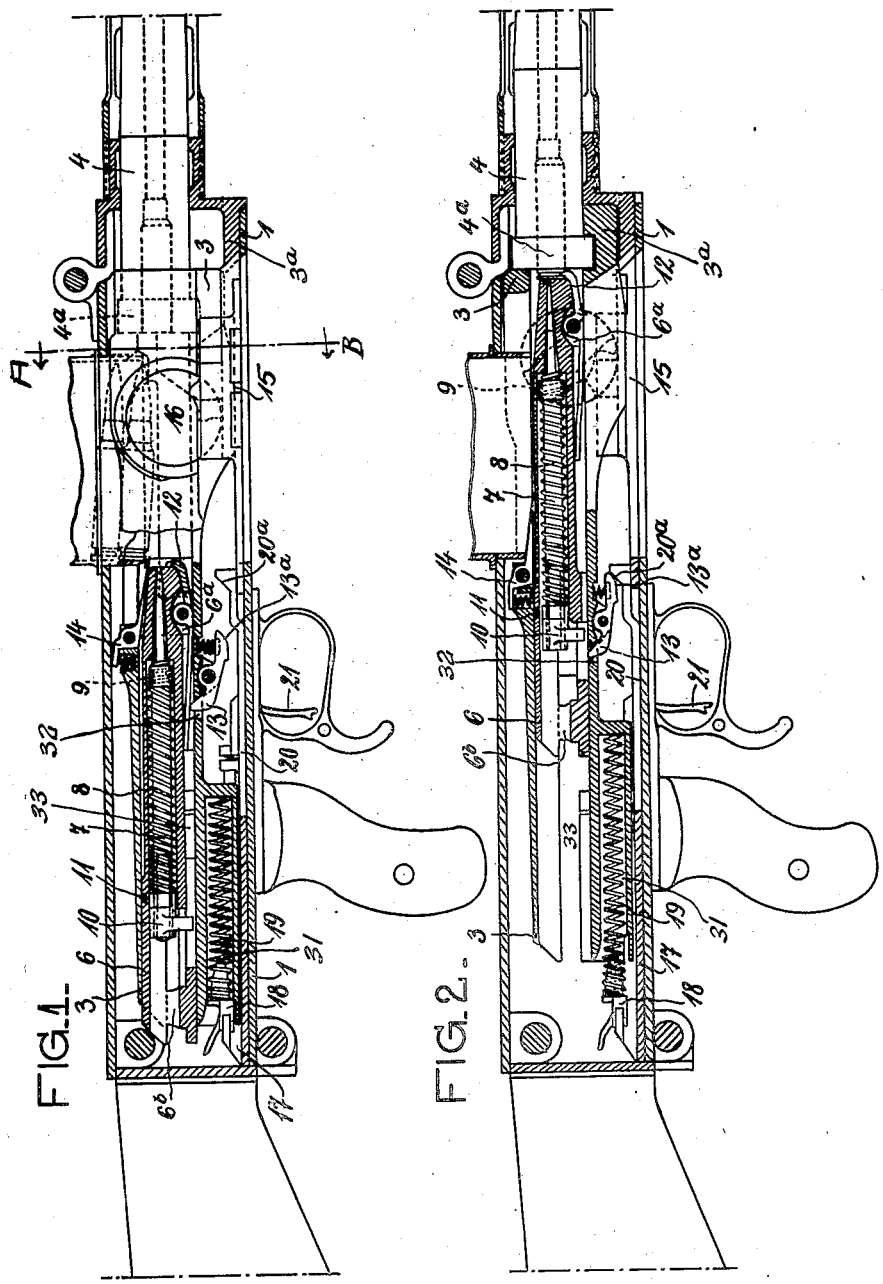

Dec. 11, 1923.
C. GAST
1,477,115
DOUBLE BARRELED MACHINE GUN WITH RECOILING BARRELS
Filed Sept. 30, 1920   5 Sheets-Sheet 3
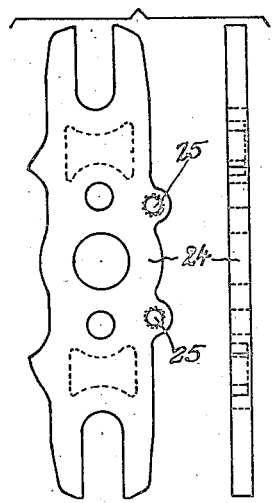
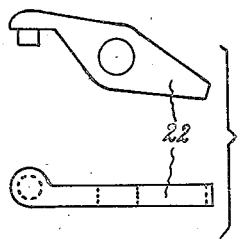
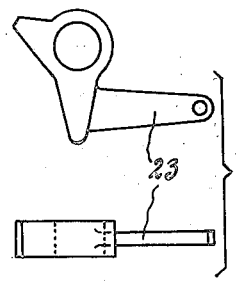
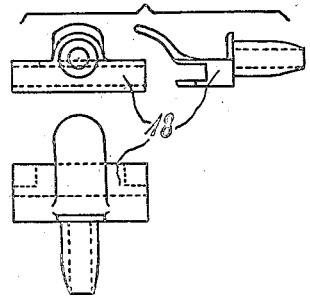
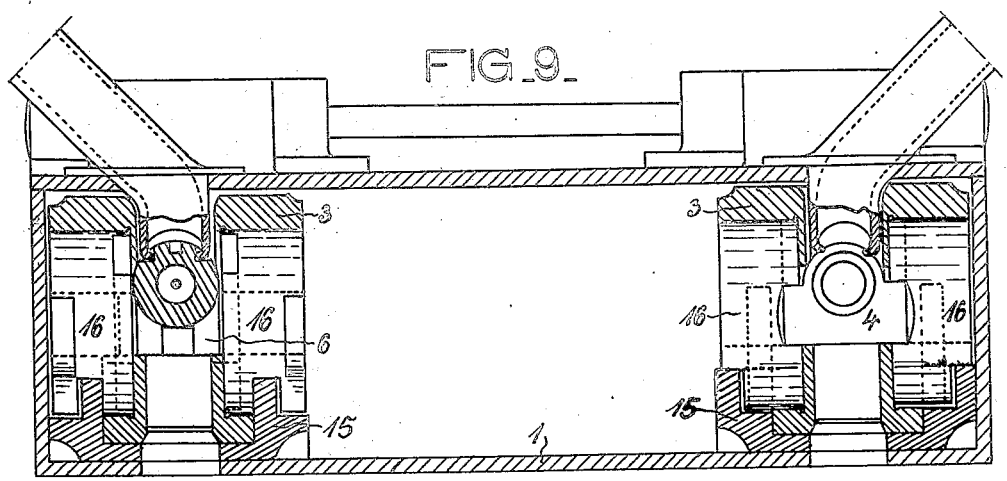
Inventor:
CARL GAST,
per
H. W. Pencher
Attorney.

Dec. 11, 1923.  
C. GAST  
1,477,115  
DOUBLE BARRELED MACHINE GUN WITH RECOILING BARRELS  
Filed Sept. 30, 1920  
5 Sheets-Sheet 4
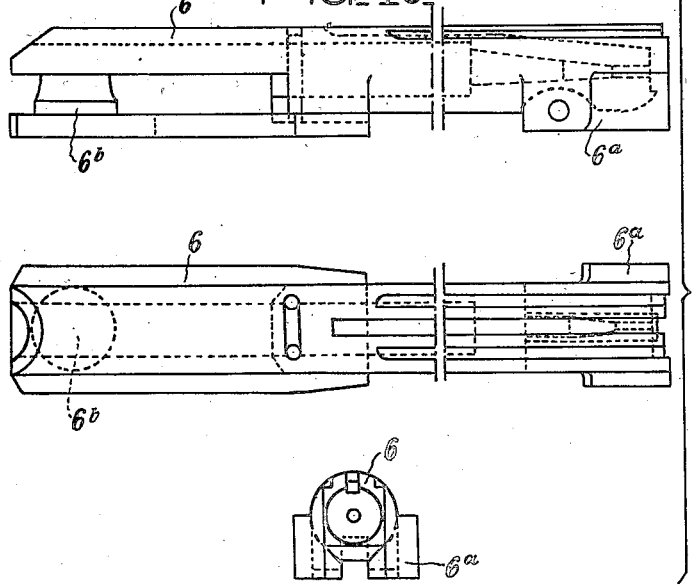
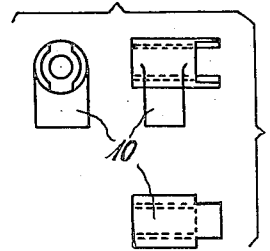
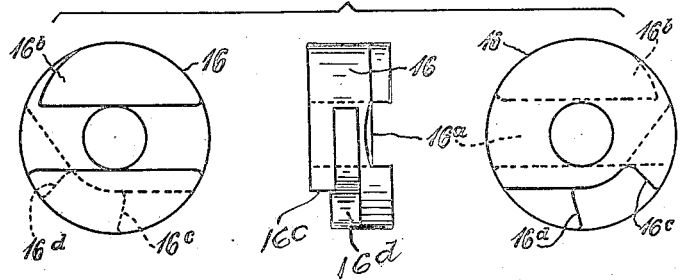
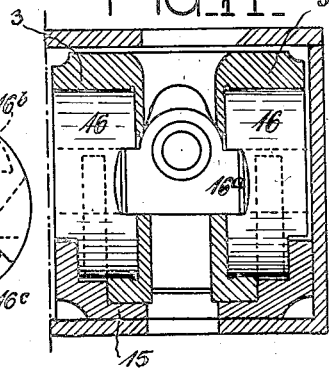
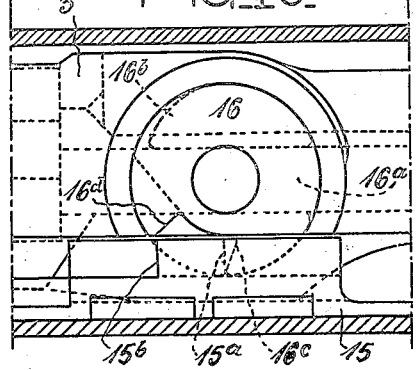
Inventor:
CARL GAST,
per H. W. Pemper
Attorney.

Dec. 11, 1923. 1,477,115
C. GAST
DOUBLE BARRELED MACHINE GUN WITH RECOILING BARRELS
Filed Sept. 30, 1920  5 Sheets-Sheet 5
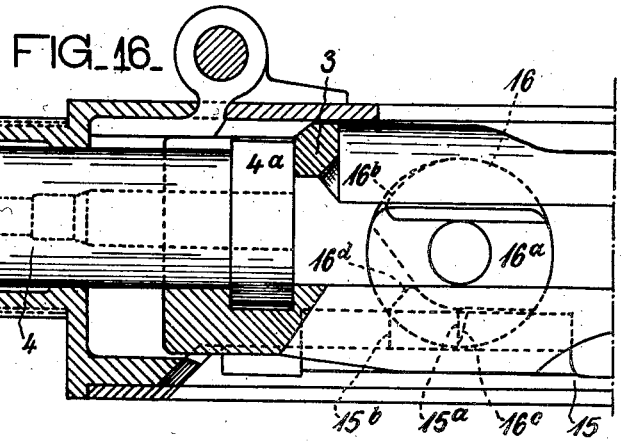
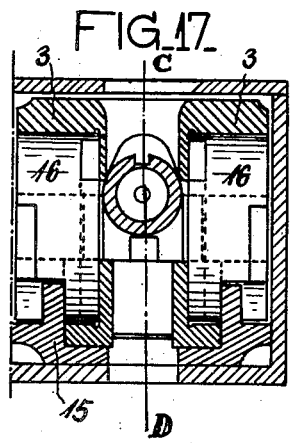
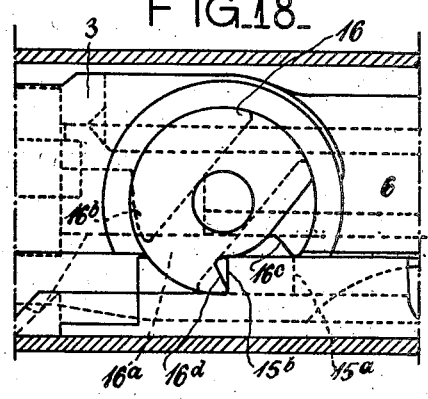
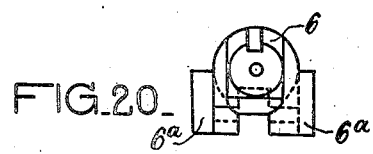
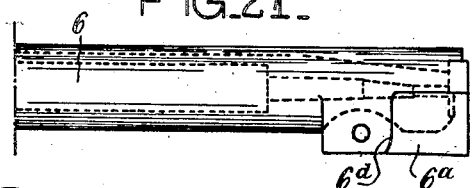
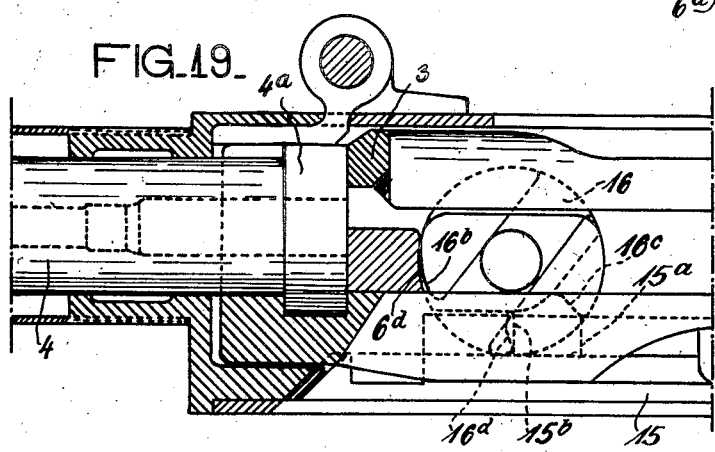
Inventor:
CARL GAST,
per H. W. Pennaker
Attorney.

Patented Dec. 11, 1923.

1,477,115

UNITED STATES PATENT OFFICE.

CARL GAST, OF BARMEN, GERMANY.

DOUBLE-BARRELED MACHINE GUN WITH RECOILING BARRELS.

Application filed September 30, 1920. Serial No. 413,887.

*To all whom it may concern:*

Be it known that I, CARL GAST, a citizen of Germany, residing at Altermarkt 30, Barmen, Germany, have invented new and useful Improvements in Double-Barreled Machine Guns with Recoiling Barrels (for which I have filed applications in Germany, Jan. 21st, 1916, and Feb. 14th, 1917), of which the following is a specification.

This invention relates to double-barreled machine guns of the recoiling barrel type.

The object of the invention is to provide an improved means of tensioning the firing mechanism.

Another object of the invention is to provide a recoiling mechanism in which no separate mechanism is required for tensioning the firing pin and in which the springs commonly used in guns of the type in question for advancing the breech block are dispensed with.

Another object of the invention is to provide a mechanism for locking each breech block in contact with the breech end of its barrel in a more reliable and positive manner than heretofore.

In accordance with these objects the invention consists in combining in a double-barreled machine gun two systems of recoiling breech and firing mechanism, one system associated with each barrel, connections between the two systems whereby recoil of one produces advance of the other system, and means operating automatically during the advance of each system to cock the firing mechanism thereof.

The invention also consists in providing a breech locking mechanism comprising rotary locking discs mounted in each breech slide, said discs being adapted when in one position to engage projecting cheeks of the breech block and lock the same against the breech end of the barrel, and in another position to allow free movement of said cheeks past the discs, the discs being turned into and out of breech closing and locking position at suitable instants by means of fixed stops.

A constructional arrangement according to the present invention is illustrated by way of example in the accompanying drawings, in which—

Fig. 1 is a sectional elevation through the opened barrel system, the breech mechanism being in tensioned condition.

Fig. 2 is a similar section showing the breech mechanism in the fired position and just before the beginning of the recoil, Fig. 3 is a plan of the gun with a partial section through the receiver, Fig. 4 is a rear view of the gun, Fig. 5 shows a plan and a side-elevation of the oscillating lever for driving the two reciprocating chambers 6;

Fig. 6 shows a side-elevation and a plan of one of the pawls holding the breech-blocks temporarily in their advanced position;

Fig. 7 shows a side-elevation and a plan of one of the two spring-connected slide-stop-levers;

Fig. 8 shows a front view, a side view and a plan of an impact member for taking up the recoil of the fired system;

Fig. 9 shows a vertical transversal section through the receiver-casing and the two-barrel system, this section being taken at the place containing the breech-locking mechanism;

Fig. 10 shows a side-elevation, a plan and a front-elevation of the breech-block;

Fig. 11 shows a front-elevation and a side-elevation of a clamp, serving as an abutment for the firing-pin spring;

Fig. 12 shows a front-elevation, a side-elevation and a plan of the firing-pin nut;

Fig. 13 shows elevations of the locking-disk of the breech-locking mechanism, seen from three different sides.

Fig. 14 is a vertical section through the breech slide showing breech locking mechanism in unlocked condition, Fig. 15 is a corresponding sectional elevation through the receiver, the locking mechanism being in unlocked condition, Fig. 16 is a section through a breech slide with the locking mechanism in unlocked condition, Fig. 17 corresponds to Fig. 14 and shows the breech locking mechanism in locked condition, Fig. 18 corresponds to Fig. 15 and shows the breech locking mechanism in locked condition, Fig. 19 is a section on the line C—D of Fig. 17, Figs. 20 and 21 show the head of the breech block with its cheeks or bosses in two views.

The gun comprises two barrel systems arranged alongside of each other in a casing or receiver 1. Each of these barrel systems comprises a barrel proper 4 and a breech slide 3 which is guided by means of two guide blocks 15 and 17 in the bottom of the receiver. The connection of the barrel 4 with the breech slide 3 is effected by means of a collar $4^a$ on the breech end of the barrel which is inserted from the top into a corresponding recess in the head $3^a$ of the breech slide, so that the barrel can be readily exchanged. On the bottom of the breech slide 3 there is provided a hollow enlargement 31 in which the breech spring 19 is contained, the free end of which spring abuts against an impact member 18 mounted on the guide block 17. On the bottom of the breech slide there is also pivoted a sear lever 13, acted upon by a spring and having one of its ends projecting through a slot 32 in the wall of the breech slide into the interior of this latter. This sear lever cooperates with the trigger rod 20, which is slidably mounted in the bottom of the receiver and is actuated by means of the trigger 21. When the rod 20 moves to the left (Figs. 1 and 2) an inclined lug $20^a$ thereon engages the end $13^a$ of the sear lever 13 in such a manner that the other end of this sear lever is withdrawn from the breech slide and releases the breech block. Whereas the rear-end of the sear lever 13, projecting through the slot 32 of the breech slide, withholds temporarily the firing pin nut 10 of the firing pin, during the advancing movement of the breech-block, there is hinged to each breech slide also a spring pressed so-called breech pawl 22, the front end of which holds the breech-block temporarily in advanced position within the breech slide, whilst during the recoil of the breech slide an opposing incline on the casing 1 swings the front end of the breech pawl away from the rear-end of the breech-block, so that the breech-block may swing back into its rear position.

The breech block works inside the breech slide 3 and consists in the usual manner of a bore or chamber 6, a firing pin 7 therein controlled by a firing pin spring 8, a counter-spring 9, a firing pin nut 10, a clamp 11 serving as an abutment for the firing pin spring 8 and having U-shaped limbs which straddle the firing pin, and an extractor 12. The breech block is forked at its rear end and a pin $6^b$ is mounted in the fork. The pins of the two breech blocks of the gun engage forked ends of a driving lever 24—see Figs. 3 and 5—which extend through slots in the breech slides 3 into the paths of the breech blocks. The lever 24 is rotatably supported by means of a pivot 34 on a block 28 on the bottom of the receiver. To the outer end of this pivot there is attached the loading handle 26, which latter is also connected with the lever 24 by means of screws 30. The driving lever carries two release pins 25, which according to the position of the lever act upon one or the other of two stop levers 23 pivoted on the guide block 17 of each breech, to turn the stops out of the path of the breech slide, in which they are normally held by means of a tension spring 35 connecting them. To each breech slide on its inner side there is attached a dog 27 which lies in the plane of the lever 24, and which on recoil of the breech slide throws over the lever. In its front part the breech slide 3 is slotted through to allow the insertion and ejection of the cartridges. Into this slot there extends from the top a cartridge ejector 14 which is pivotally mounted in the breech slide and acted upon by a spring. The head of the breech slide 3, guided in the block 15, is provided on both sides with circular recesses, in which are rotatably mounted two locking discs 16, which lock the head or front end $6^a$ of the breech-block 6 in its forward position and thereby bring about the locking of the breech with the firing pin spring in tensioned condition in a manner described hereinafter. The locking discs are provided on the inner side with a slot $16^a$ adapted to allow passage of the cheek $(6^a)$ on the breech block. The locking discs are also provided on the outer side with a recess having two striking faces $16^c$ and $16^b$ arranged opposite to each other but axially displaced—see Fig. 13. These striking faces lie in the path of two correspondingly formed fixed abutments $15^a$ and $15^b$ on the block 15, which during the forwards and backwards stroke of the breech slide effect shifting of the locking discs 16 into locking or releasing position by striking the contact face $16^d$ or $16^e$.

The mode of operation of the gun is as follows:

By means of the loading handle 26 the open breech block 6 (in Fig. 3) is moved forwards into contact with the barrel. During part of the forward movement the firing pin spring 8 is tensioned by means of the clamp 11, the U-shaped limbs of which it abuts. Just before the breech block reaches the barrel, the release pin 25 of the driving lever 24 strikes against the slide stop lever 23 and swings it out in such a manner that it releases the slide, allowing this latter to be urged forwards by the spring 19. The slots $16^a$ of the locking discs 16 are in such a position up to the time that the release pins 25 encounter the levers 23, that they provide a free passage for the cheeks $6^a$ of the breech block (Fig. 13). On further forward movement of the slide which now takes place upon retraction of the levers 23, the striking faces $16^c$ of the locking discs 16 meet the fixed abutments $15^a$ of the blocks 15, whereby the discs 16 are rotated causing the eccentric rubbing surfaces 16ᵇ to engage the rear surfaces 6ᵈ of the cheeks 6ᵃ, and thereby arrest and lock the breech block (Figs. 17–19). The breech of this system is now closed in tensioned condition and the gun ready to fire, while the breech of the other system, on the contrary, is open.

To fire the gun, the trigger 21 is pulled. The trigger rod 20 which is common to both systems is thereby actuated and its inclined lugs 20ᵃ act upon the end 13ᵃ of the sear lever 13 of the breech system which is in the forward position in such a manner that the end of the sear lever which extends into the path of the firing pin nut 10 is withdrawn. The firing pin 7 is freed and the firing pin spring 8 urges the pin forwards against the end of the cartridge, so that the latter is fired. The position of the parts at this instant is shown in Fig. 2. The breech block 6, breech slide 3, and the fired barrel recoil at first as a whole. Hence the pin 6ᵇ, the extreme end of the lever 24, and the dog 27 have the same velocity of translation. The part of the lever 24 opposite the point or tip of the dog 27, being much nearer the pivot than the extreme end of the lever, will move backward more slowly than the pin 6ᵇ and than the tip of the dog 27, whereby this tip will approach the adjacent part of the lever 24 as the parts recoil. The timing is such that the tip of the dog 27 will strike the lever after the breech block 6 has been unlocked from the slide 3 in a manner described hereunder. The impact of the dog on the lever 24 at a place near the pivot gives a greatly accelerated motion to the lever which is transmitted to the breech block 6. The latter then begins to move backwards more rapidly than the slide while the other breech block 6 is correspondingly shot forwards.

The unlocking of the breech block 6 from the breech slide 3 is caused by the faces 16ᵇ of the locking discs 16 impacting upon the fixed abutments 15ᵇ, whereby the discs 16 are turned and the slots 16ᵃ give free passage to the cheeks 6ᵃ of the breech block (Figs. 14–16). It is seen that one arm of the lever 24 returns the breech of the fired system into the opened position and the other arm throws the breech of the other system forwards in order to lock the same. This forward movement of the breech is effected with sufficient force to effect the tensioning of the firing pin spring automatically in the manner previously described, which tensioning is effected by hand in the first loading of the weapon. The recoil of the slide 3 with the barrel is taken up by the slide impact member 18 and the slide spring 19. In this operation the spring immediately urges the slide forward again until the lever 23 again snaps into its recess 36 and thereby interrupts the movement of the slide and locks the same. The operation is repeated alternately in the two systems and automatically, as just described, as long as the gunner holds back the trigger rod 20 by means of the trigger 21.

The eccentric arrangement of the locking surfaces 16ᵇ produces the effect that during the locking action the contact between the surfaces takes place smoothly and without shock, whilst on opening of the lock the surfaces move away from the cheeks of the breech block gradually and with reduced friction.

Compared with other locking mechanisms, that of the present invention is distinguished by extreme reliability, its duplex arrangement, and its solidity of construction.

I claim:—

1. A machine gun comprising in combination: a receiver; two recoiling barrel systems slidable therein, each system containing a reciprocating barrel, a breech slide connected with the barrel, a breech-block arranged slidably in each breech slide, a firing pin in each breech-block, and a firing pin spring controlling the firing pin; a rocking lever connecting the two recoiling systems; a dog on each breech slide, adapted to throw over the rocking lever in consequence of the recoiling momentum of the fired system; a pin provided on each breech-block, and forked ends at the rocking lever engaging the pins on the breech-blocks, so as to swing forward the one breech-block during the recoil of the other breech-block.

2. A machine gun comprising a receiver, two recoiling barrel systems slidable therein, each comprising a breech slide, a breech block, and firing mechanism, a rocking lever connecting the two systems in such a manner that recoil of one system is attended by advance of the other system, projecting cheeks on each breech block, rotary locking discs mounted in each breech slide, said discs being adapted when in one position to engage the projecting cheeks of the breech block and lock the same against the breech end of the barrel, and in another position to allow free movement of said cheeks past the discs, and means for turning the discs into breech closing and locking position at the end of the advance of the breech slide and for turning said discs into their unlocking position during the recoil of the slide.

3. A machine gun comprising a receiver, two barrels adapted to recoil therein, a breech slide connected to each barrel, a breech block in each slide adapted to slide therein, a firing pin in each breech block, a firing pin spring for each firing pin, a rocking lever connecting the breech blocks of the two systems of recoiling parts, a dog on each breech slide adapted to swing over the lever at the proper times and in such a manner that the recoil of one system is attended by advance of the other system, means whereby the firing pin of the advancing system is cocked during its advance by the energy imparted to said system by the recoil of the other system, projecting cheeks on each breech block, rotary locking discs mounted in each breech slide, said discs being adapted when in one position to engage the projecting cheeks of the breech block and lock the same against the breech end of the barrel, and in another position to allow free movement of said cheeks past the discs, and means for turning the discs into breech closing and locking position at the end of the advance of the breech slide and for turning said discs into their unlocking position during the recoil of the slide.

In testimony whereof I have signed my name to this specification.

CARL GAST.